May 19, 1953 A. F. FROUSSARD 2,638,802
BORING IMPLEMENT
Filed Sept. 26, 1949
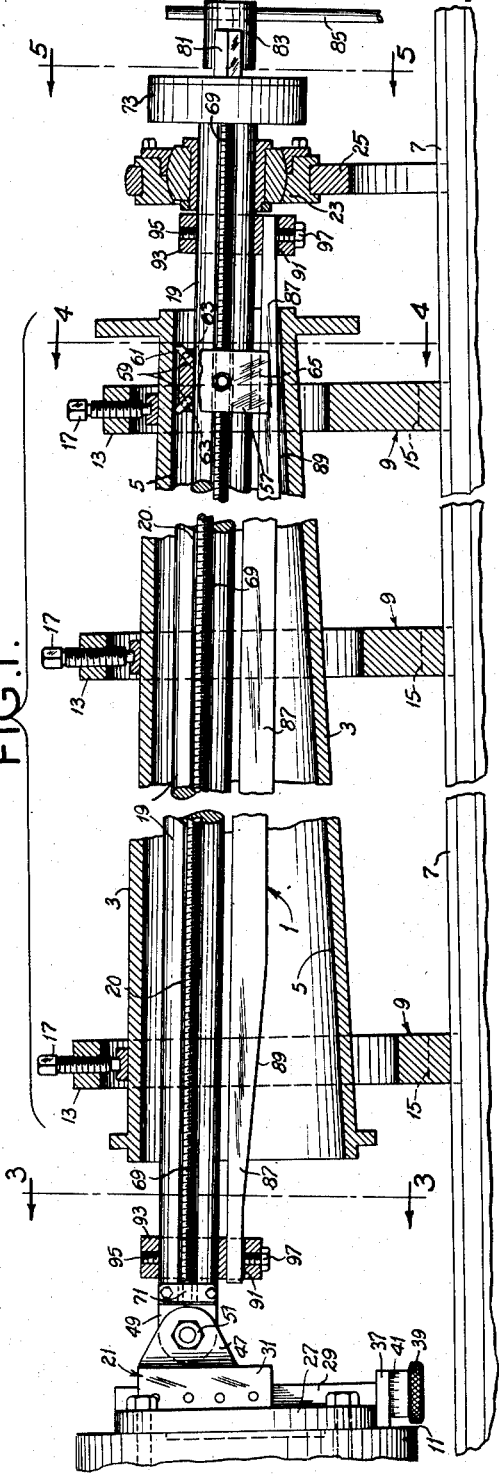
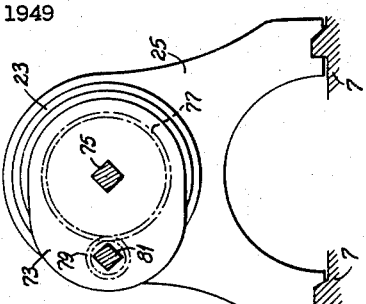
FIG. 5.
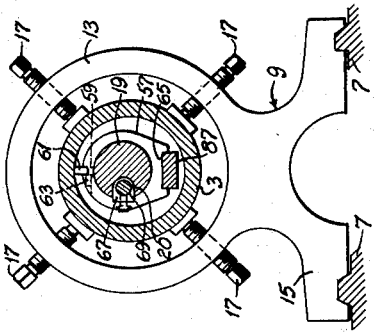
FIG. 4.
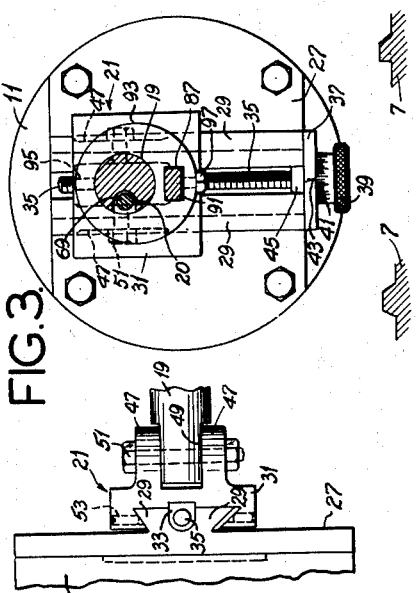
FIG. 3.
Albert F. Froussard,
Inventor,
Haynes and Koenig,
Attorneys.

Patented May 19, 1953

2,638,802

UNITED STATES PATENT OFFICE 2,638,802

BORING IMPLEMENT

Albert F. Froussard, St. Louis, Mo.

Application September 26, 1949, Serial No. 117,864

4 Claims. (Cl. 77—56)

This invention relates to boring implements and more particularly to such implements for boring relatively long work pieces.

The principal object of the invention is the provision of a boring implement for boring out relatively long work pieces, of the type wherein a cutter head is moved axially along a boring bar, so constructed as to operate without objectionable vibration while being of practicable size. The principal feature of the invention is the provision on the boring bar of a stiffening beam fixed to the bar extending parallel to and spaced from the bar with the cutter head in sliding engagement with the stiffening beam throughout its range of movement on the bar, the arrangement being such that stresses to which the bar is subjected by the cutting action, which stresses are highest when the cutter head is at the center of its range of movement, are in part taken up by the stiffening beam thereby resisting vibration. The boring implement of this invention is particularly adapted for use on existing lathes and is particularly suitable for taper boring. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which one of various possible embodiments of the invention is illustrated, Fig. 1 is a longitudinal cross-section illustrating a boring implement of this invention on a lathe, with parts broken away;

Fig. 2 is a plan view of the left end of Fig. 1;

Fig. 3 is a section on line 3—3 of Fig. 1;

Fig. 4 is a section on line 4—4 of Fig. 1; and

Fig. 5 is a section on line 5—5 of Fig. 1.

Similar reference characters indicate corresponding parts throughout the several views of the drawing.

Referring to the drawing, a boring implement of this invention, generally designated 1, is shown as mounted in a lathe for taper boring a relatively long work piece 3. As herein illustrated, the work piece consists of an elongate tapered tubular member having an interior conical surface 5 which is to be bored. The bed of the lathe is designated 7. On the bed of the lathe are fixed a number of work holders 9 for holding the work piece coaxial with the face plate 11 of the lathe. As shown, each work holder comprises a ring 13 on a base 15, the latter being fixed to the bed of the lathe. The work piece extends through the rings and is clamped in centered position by screws 17 threaded through the rings.

The boring implement 1 extends through the work piece. It comprises a rotatable boring bar 19, herein illustrated as being a solid bar of circular cross-section having an axial or longitudinal groove 20 extending from one end to the other. One end of the bar is detachably coupled to a taper setting device 21 attached to the face plate 11 of the lathe. The other end of the bar is journalled for rotation and supported for rocking movement in a universal bearing 23 which is clamped in the steady rest 25 of the lathe.

The taper setting device 21 comprises an adaptor plate 27 which is bolted to the face plate 11 of the lathe. The adaptor plate is provided with parallel guide ways 29 spaced equal distances on opposite sides of a line perpendicular to the axis of the face plate of the lathe. A slide 31 is slidably dovetailed on the ways 29 for radial adjustment with respect to the axis of the face plate 11 and the work piece 3. A nut 33 projects from the slide between the ways. An adjusting screw 35 is threaded through the nut. The screw 35 is journalled in a plate 37 fixed at one end of the ways 29. On the outer end of the screw 35 and bearing against the plate 37 is an adjusting knob 39 on which is scribed a dial 41, calibrated in units of distance, for example .001 inch per graduation, readable in conjunction with an index mark 43 scribed on the plate 37. The screw 35 is held against axial movement by a collar 45 bearing against the side of the plate 37 opposite the knob. The arrangement is such that by turning the knob in one direction or the other, the slide 31 may be adjusted radially toward or away from the axis of the lathe face plate to vary the eccentricity of the end of the boring bar with respect to the axis of the face plate.

The slide 31 is formed with a clevis 47. The boring bar 21 is formed with a flat end portion 49 in a plane at right angles to the diametrical plane of the groove 20. This flat end portion of the bar fits in the clevis and is detachably and pivotally coupled thereto by means of a bolt and nut connection 51. The bolt may be tightened to lock the end of the boring bar to the slide 31. At 53 is shown a set screw threaded through one side of the slide for locking the slide in adjusted position.

A cutter head 57 is axially slidable on the boring bar 19. The cutter head is made in the form of a collar encircling and having a sliding fit on the bar. In the cutter head are recesses 59 receiving cutting tools 61 projecting substantially radially from the head and held in the recesses by set screws 63. As shown, there are two such recesses and cutting tools. Both recesses (and tools) are aligned in the same diametrical plane. On the side of the cutter head diametrically opposite the tools, the cutter head is formed with an axial groove 65 of rectangular cross-section in its outer surface. This groove is centered with respect to the diametrical plane of the tools. A nut 67 is attached to the inside of the cutter head with its axis extending axially in respect to the cutter head and, as shown, located in the diametrical plane at right angles to the diametrical plane of the tools 61 and the groove 65. The cutter head is mounted on the boring bar 19 with the nut 67 extending into the boring bar groove 20, the latter being of cross-section corresponding to the shape of the nut so that the nut slidably engages the surface of the groove. This keys the cutter head to the bar for rotation therewith, while permitting axial movement of the cutter head along the bar.

A planetating cutter head feed screw 69 extends axially of the boring bar in the groove 20 from one end of the bar to the other and extends through the nut in threaded engagement therewith. Adjacent the flat end 49 of the boring bar, the feed screw is journalled in a bearing 71 fixed to the bar. On the other end of the boring bar is a gear box 73. The feed screw extends into the gear box, being journalled in the wall of the box, and has a squared end 75 for application of a wrench manually to turn the screw. The gear box houses a gear train for turning the feed screw in response to rotation of the boring bar. In a simple version, as illustrated, this gear train includes a gear 77 fixed on the feed screw and a pinion 79 in mesh with the gear. The pinion is provided with a squared hub 81 on which may be applied a socketed head 83 at the end of a rod 85, the latter being adapted for engagement with a fixed stop (not shown) to keep the pinion from turning about its axis as the boring bar rotates. It will be understood that gear trains of different ratios may be used, also that a reversing gear train may be used.

At 87 is shown a stiffening beam fixed at its ends to the boring bar 19 to turn therewith extending parallel to and closely adjacent the bar substantially throughout the length of the bar. The beam is spaced from the bar a distance such that it extends through the groove 65 in the cutter head with the cutter head in sliding engagement with the beam. As shown, the beam consists of a bar of rectangular cross-section having a width corresponding to the width of the groove 65. The ends of the beam may be tapered on the outside as indicated at 89, for reduction in dimensions, and so that the beam approximates the form of a beam of constant strength. The inner side of the beam opposed to the boring bar is straight throughout its length for sliding engagement of the cutter head with the beam through the range of travel of the cutter head. As shown, the beam is fixed at its ends in openings 91 in collars 93, the latter being fixed on the beam by set screws 95. Set screws 97 hold the ends of the beam in the collars.

In use, the slide 31 is adjusted to the setting required for the taper to be bored. The lathe is driven to rotate the boring bar 19 and the cutter head 57 thereon. The stiffening beam 87 rotates with the bar. As the boring bar rotates, the cutter head 57 is moved axially along the bar by the feed screw 69. As the cutter head moves along the bar, it slides on the stiffening beam. Stresses arising from the cutting action of the cutting tools 61 are transmitted through the cutter head to the stiffening beam, the latter being located diametrically opposite the cutting tools to back up the cutter head and thus to resist bending and consequently to resist vibration. This is particularly important when the cutter head is being moved through the center of its range of movement at which time stresses tending to cause vibration are a maximum.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. A boring implement comprising a rotatable boring bar having a longitudinal groove, a planetating feed screw carried by the bar in the groove, a cutter head axially slidable on the bar, said cutter head being in the form of a collar encircling and having a sliding fit on the bar and carrying a nut extending into the groove threaded on the screw and keying the cutter head to the bar for rotation therewith and axial movement therealong, a cutting tool projecting substantially radially from the head, and a stiffening beam consisting of a bar rigidly fixed at its ends to the boring bar to turn therewith extending parallel to and closely adjacent the boring bar diametrically opposite the cutting tool, the cutter head being in sliding engagement with the stiffening beam.

2. A boring implement as set forth in claim 1 wherein the cutter head is in sliding engagement with the beam in an axial groove in the head.

3. A boring implement as set forth in claim 1 wherein the stiffening beam is rigidly fixed at its ends to collars fixed on the boring bar.

4. A boring implement as set forth in claim 1 wherein the stiffening beam is of rectangular cross section with one of its sides opposed to the boring bar and straight throughout its length, the ends of the stiffening beam being tapered on the opposite side, the cutter head having an axial rectangular groove receiving the beam, and the ends of the beam being rigidly fixed in openings in collars fixed on the boring bar.

ALBERT F. FROUSSARD.

References Cited in the file of this patent

UNITED STATES PATENTS

| Number | Name | Date |
|---|---|---|
| 1,436,522 | Pedrick | Nov. 21, 1922 |
| 1,518,707 | Sleeper | Dec. 9, 1924 |

FOREIGN PATENTS

| Number | Country | Date |
|---|---|---|
| 64,553 | Sweden | Feb. 7, 1928 |